3,002,867
LAMINATES
Jacques Schmidt and Pierre Schmidt, both of Strasbourg-Robertsau, France, assignors to Societe anonyme dite: Papeteries de la Robertsau, Strasbourg-Robertsau, Bas-Rhin, France, a French society
No Drawing. Filed July 19, 1957, Ser. No. 672,884
Claims priority, application France July 23, 1956
6 Claims. (Cl. 154—45.9)

This invention relates to laminates, and especially to laminate panels of the type comprising a rigid base element, a flexible sheet element of comparatively heavy thickness and constituting a decorative surface, and a protective surface sheet element or "overlay," usually of more or less translucent character and lightweight, applied over the decorative element.

It is a general object of the invention to provide a laminate of the type described, which will have a more attractive aspect and will be more resistant to wear and tear than previous laminate articles of this kind.

In laminate panels of the type referred to, the base element may be provided in any of various forms, e.g. a sheet of plywood, pasteboard or synthetic resin, or a laminate assembly of rigid or flexible sheets such as paper, various plastic sheet materials, etc. The ornamental sheet element applied over this base may comprise paper, or textile fabric natural or synthetic, and may be white, colored or bear printed patterns. The protective surface element or overlay applied over the ornamental sheet has usually comprised relatively lightweight, smooth paper, translucent, white or in color.

The sheet elements prior to assembly are usually subjected to dipping treatments in thermosettable synthetic resin, dried, cut to size and pressed at somewhat elevated temperature to provide the final laminate assembly.

It has been found that the thin-gauge overlay after subjection to the above treatments often presents an imperfectly transparent appearance and is mottled or veined, imparting an unattractive aspect to the underlying ornamental surface. The effect is the same whether the overlay used is white or colored. It is an object of this invention to overcome this defect. Another object is to improve the bond between the overlay and the underlying ornamental surface.

According to an important aspect of the invention, a laminate of the type specified is characterized by the use of corrugated or craped sheet material, such as craped paper, as an overlay sheet therein. In a preferred form of the invention, the overlay is a craped sheet of cellulose wadding of the type produced by the method disclosed in French patent No. 1,105,321. According to that patent, a pulp comprising bleached cellulose together with constituents adapted to form a synthetic resin in situ, is treated in a refining pile, and is thereafter passed through a cellulose wadding machine.

It is found according to the invention that when such a craped sheet is dipped in synthetic resin as previously described, the creases in the craped sheet act to retain a considerable amount of excess resin, so that a substantially greater weight of resin is retained per unit area of such a craped sheet than per unit area of a smooth sheet of similar composition. It is also found that as a result of this excess resin retained in its creases the overlay sheet is, after the pressing step, brought to a "glazed" condition in which it possesses improved transparency and thus greatly enhances the attractiveness of the panel in that it does not mar the aspect of the underlying ornamental surface.

Further, the strength and protective characteristics of the craped overlay sheet, are greatly improved owing especially to the increased amount of resin retained in the creases thereof, so that a thinner-gauge sheet may be used for the overlay than was heretofore found possible. A preferred range of weights per unit area for creased overlay sheets of cellulose wadding according to the invention, prior to the synthetic resin treatment, is about from 10 to 30 grams per square meter. This weight is of course greatly increased after the dipping and drying operations due to the weight of resin impregnating the creases, but it is found that a sheet having the specifications just indicated is sufficient in strength to be self-supporting with this increased weight. As already mentioned and as will be readily understood, the resulting overlay sheet has a markedly higher protecting action than previous smooth overlay sheets even substantially greater in thickness.

More broadly, the invention contemplates the provision of any form of laminate assembly including at least one element comprising a sheet of craped material, such as paper or cellulose wadding, preferably coated and/or impregnated with synthetic resin or equivalent composition. Such a laminate will display part or all of the improved characteristics disclosed above owing to the increased amount of impregnant retained in the creases thereof. Such a craped sheet according to the invention may be substituted for any of the smooth elements heretofore provided in laminate assemblies, and in particular for the "ornamental" sheet of the laminate panels specified hereinabove.

The invention encompasses within its scope craped overlay sheets impregnated and set or dried, prior to lamination to supporting or base elements, as well as the complete laminates including such a craped overlay bonded to the surface thereof, and also laminate panels or other laminate assemblies wherein at least one sheet element, in addition to or instead of the overlay element, is a craped sheet as described. The invention may further include apparatus for use in manufacturing such elements and laminates, and particularly apparatus for impregnating craped sheets with synthetic resin composition, and hot pressing equipment for applying the impregnated craped elements to a base.

What we claim is:

1. A laminate article which comprises a base element, an ornamental sheet element bonded to the base, and an overlay element bonded over said ornamental sheet element, said overlay element comprising a thin element of craped sheet material having a settable resin impregnating the creases thereof.

2. An article as claimed in claim 1, wherein said ornamental sheet element comprises an element of craped sheet material having a settable resin impregnating the creases thereof.

3. An article as claimed in claim 1, wherein said overlay element comprises a thin element of craped cellulose wadding material, having a weight in the approximate range of from 10 to 30 grams per square meter.

4. An article as claimed in claim 1 wherein said overlay element comprises craped paper.

5. An article as claimed in claim 1 wherein said overlay element comprises a thin element of craped cellulose wadding material having a weight of about 20 to 30 grams per square meter.

6. A laminated article as claimed in claim 1 wherein the ornamental sheet element is a craped element.

(References on following page)

References Cited in the file of this patent

UNITED STATES PATENTS

| | | |
|---|---|---|
| 2,030,558 | White | Feb. 11, 1936 |
| 2,092,502 | Ellis | Sept. 7, 1937 |
| 2,496,122 | Donahue | Jan. 31, 1950 |
| 2,605,205 | Patterson et al. | July 29, 1952 |
| 2,801,198 | Morris et al. | July 30, 1957 |
| 2,857,302 | Burton et al. | Oct. 21, 1958 |

FOREIGN PATENTS

| | | |
|---|---|---|
| 767,593 | Great Britain | Feb. 6, 1957 |